United States Patent [19]

Baermann

[11] 3,874,482

[45] Apr. 1, 1975

[54] EDDY CURRENT AND HYSTERESIS BRAKE FOR TRACK BOUND VEHICLES

[76] Inventor: Max Baermann, 506 Bensberg, Bezirk, Cologne, Germany

[22] Filed: Dec. 3, 1973

[21] Appl. No.: 421,128

[30] Foreign Application Priority Data
Aug. 7, 1973 Germany............................ 2340774

[52] U.S. Cl................................ 188/165, 336/223
[51] Int. Cl. ........................................... H02k 49/04
[58] Field of Search .......... 188/165; 303/3; 310/93; 335/299, 300; 336/223, 232

[56] References Cited
UNITED STATES PATENTS
896,740   8/1908   Mayo................................. 188/165

FOREIGN PATENTS OR APPLICATIONS
458,911   12/1936   United Kingdom................. 188/165
249,190   7/1912   Germany............................ 188/165

Primary Examiner—Duane A. Reger
Attorney, Agent, or Firm—Meyer, Tilberry & Body

[57] ABSTRACT

An electrically-energized eddy current and hysteresis brake for track bound vehicles having improved braking and heat dissipation characteristics. A plurality of electromagnets are arranged longitudinally of the track, each magnet being comprised of a pair of spaced pole branches extending perpendicularly away from the track, a coil core extending parallel to and spaced from the track and a coil around the core having an axial length in the space between the pole branches and the track substantially less than the coil length on the sides and portion of the coil core remote from the track.

9 Claims, 2 Drawing Figures

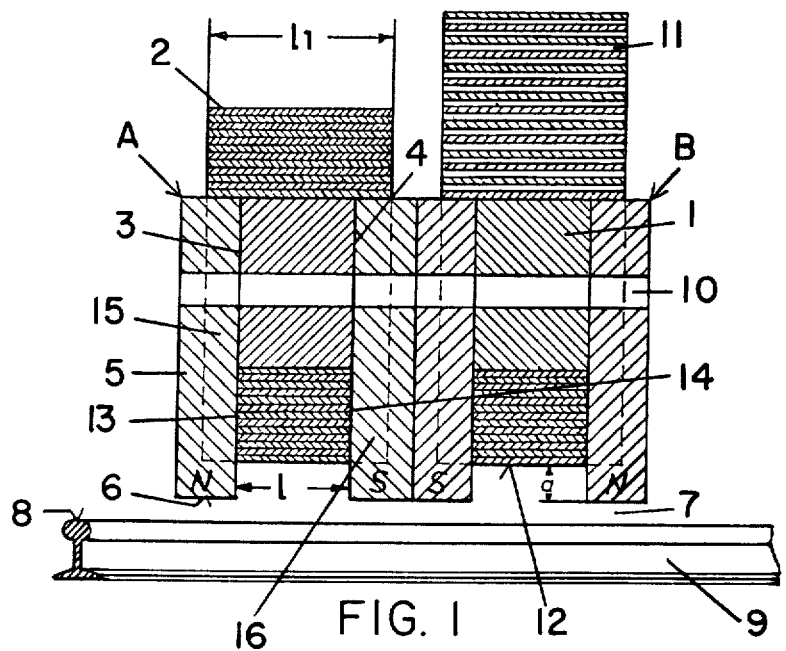
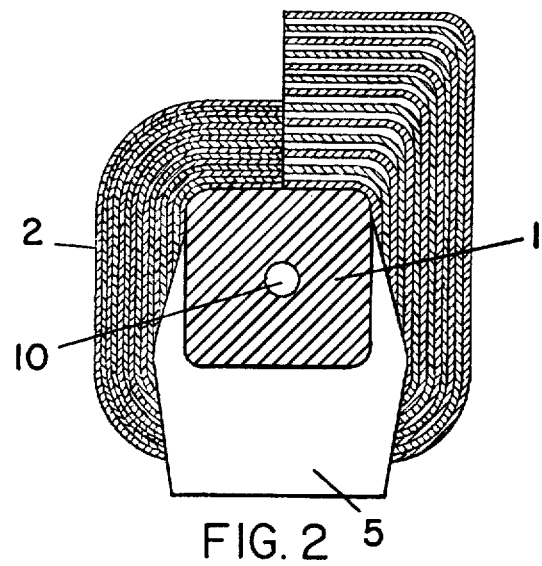

EDDY CURRENT AND HYSTERESIS BRAKE FOR TRACK BOUND VEHICLES

This invention pertains to the art of brakes for track bound vehicles and more particularly to an electrically energized eddy current and hysteresis brake for such vehicles.

For braking track bound vehicles, it is known to provide an eddy current and hysteresis brake fastened to the nonresiliently mounted parts of the bogie of a track bound vehicle so that the pole faces of the magnets face the tread of the track with an intermediate constant air gap. For the purpose of braking, this type of track brake is either excited by drive motors acting as generators or by means of electric current supplied from a remote power source through trolley wires or a third rail and a sliding contact on the vehicle. The braking power is produced by eddy currents and hysteresis losses developed by the motion of the magnets relative to the track.

One brake which has already become known consists of a laminated iron core extending in the longitudinal direction of the track and having grooves arranged thereon facing the track and extending transversely thereto. Energizing windings, with a continuous direction of winding, are provided within these grooves. Due to the small number of poles of alternating polarity, the braking force is relatively low.

Another type of brake which has also become known has the energizing windings so arranged on the pole branches that their axes extend in a direction perpendicular to the track. With these brakes, the direction of winding is such that the polarity alternates from pole to pole. Due to the number of poles of alternating polarity, a higher braking force can be achieved.

Because of the rough nature of most rails for trains, the air gap between the pole faces of the pole branches and the track must be wide enough such that a smooth operation is guaranteed. Due to this relatively large air gap, the magnetic leakage occurring between the pole branches is considerable. Because the magnetic leakage flux does not contribute to the braking operation, the braking force is reduced for a given number of ampere turns in the winding. However, the provision of a greater number of ampere turns in the winding for the purpose of increasing the braking force is limited to the magnetic saturation of the coil core and the pole branches as well as the corresponding larger amounts of heat generated by the higher currents. Furthermore, the overall length of the brake cannot be enlarged at will, since it is common practice to arrange the track brakes between the running wheels of the bogie, for example, as is seen in my U.S. Pat. No. 3,723,795.

The present invention contemplates an eddy current and hysteresis brake for track bound vehicles which overcomes all of the above referred-to difficulties, and provides improved braking and heat dissipation characteristics for a given amount of electrical energization.

In accordance with the invention, the track brake consists of a plurality of electromagnets arranged longitudinally of the track, each magnet being comprised of: a pair of pole branches spaced longitudinally of the track and each extending perpendicularly away from the track; a coil core extending parallel to and spaced from the track; and, a coil or winding around the core having an axial length $l$ in the space between the pole branches and the track substantially less than the axial length $l_1$ on the sides and portion of the coil core remote from the track.

By substantially less, is meant, a ratio of coil lengths $l$ to $l_1$, between the pole branches and the coil core on the track to the remaining portions of the coil of at least 1 to 1.5. In accordance with the present invention, there are substantially achieved two particular advantages. As generally known, the magnetic field strength H is proportional to the relation $W \times I/l$, where W stands for the number of turns, I for the intensity of current and l for coil length. By reducing the coil length ($l$) between the pole branches, the magnetic field strength of this portion of the coil circumference becomes higher compared to the other portion of the coil circumference having a greater coil length ($l_1$).

The magnetic field strength of the coil is opposite to the leakage flux between the pole branches. Thus, the leakage occurring between the pole branches, is considerably reduced by the higher field strength intermediate these pole branches. In accordance with this invention, this practically leads to a higher density of the magnetic lines of flux between the poles of the pole branches and the track, thereby producing a greater braking force. Moreover, the distance between the individual pole branches can be reduced such that with the same overall length of the brake, a greater number of poles of alternating polarity can be provided. In addition, there also results a higher braking force which is due to the greater number of poles of alternating polarity.

In that portion of the coil circumference with the smaller coil length ($l$), the current density is higher than in the other portion of the coil circumference with the greater coil length ($l_1$). However, since that part of the coil circumference with the smaller coil length ($l$) is relatively short, the higher current heat produced therein can be conducted quickly to that coil portion with the greater coil length ($l_1$) where it can be dissipated well through the greater surface area.

Such a favorable dissipation of heat is achieved due to the good thermal conductivity of the material used for the coil winding. Since there is sufficient space available in that part of the brake which is turned away from the track, it is possible to provide air channels between the individual windings of the energizing coil in order to achieve an even better dissipation of heat by means of an air stream or a cooling liquid.

By this particularly advantageous construction of the brake in accordance with the invention, it is also possible to achieve very high air gap inductions, even if greater air gaps than 7–8 mm are provided between the pole faces of the pole branches owing to the rough nature of most rails for trains. Even during long braking operations, the temperature in the track brake does not exceed the allowable limit, a fact that is due to the good dissipation of heat.

In another embodiment in accordance with this invention, it is of special advantage that the length of the pole branches has been so selected that these only protrude by a distance of 5–30 mm with respect to the outer surface of the coil and in the direction of the track.

The pole branches only protrude radially relative to the coil core in the direction of the track. The individual coils are wound from a ribbon of copper of width $l_1$ and in order to reduce the length of the coils between the pole faces to length $l$, recesses are provided on the opposite axial faces of the coils to provide room for the pole branches. These recesses can e.g., be milled out of the ready-wound coil.

It has been found out that the eddy-current and hysteresis brake in accordance with the present invention shows a particularly good continuity of the magnetic lines of flux emanating from the poles, provided that the central pole of the brake is of same polarity as the poles at its ends.

The principal object of this invention is to provide an eddy-current and hysteresis brake of the aforedescribed type for track-bound vehicles wherein the leakage losses occurring between the pole branches of opposite polarity are reduced to a considerable extent so that, despite the relatively wide air gap between the track and the effective pole faces of the pole branches, a high air gap induction can still be achieved.

A further object of this invention is to provide an eddy-current and hysteresis brake of the aforedescribed type for track-bound vehicles wherein a good dissipation of the resultant current heat is obtained.

The aforementioned objects and advantages will become apparent from the following description used to illustrate a preferred embodiment of the invention when read in connection with the accompanying drawings in which:

FIG. 1 is a vertical sectional view, illustrating two different electromagnetically excited braking elements of the eddy-current and hysteresis brake according to the invention which are arranged in series in the direction of motion.

FIG. 2 is a bisectional view illustrating the left braking element A and the right braking element B according to FIG. 1, with the coil core and the energizing coil being shown in sectional view.

Referring now to the drawings wherein the showings are for the purpose of illustrating a preferred embodiment of the invention only and not for the purpose of limiting same, FIG. 1 shows two braking elements A and B which consist of a central coil core 1 having the energizing coil 2 arranged thereupon. Onto the opposite front faces 3 and 4 of the coil core 1, the pole branches 5 are fastened. The pole faces 6 of the pole branches are facing the tread 8 of the track 9 with an intermediate air gap 7. These pole branches 5 preferably are dimensioned so that they do not protrude radially beyond the coil core 1 except in the direction of the tread 8.

A plurality of these electromagnetically excited braking elements are aligned with each other in the direction of motion to form a complete brake. For this purpose, both the pole branches and the coil cores are provided with at least one bore 10 extending in the direction of motion and having connecting elements (not shown) such as connecting bolts included therein. The energizing coils 2 are wound from element to element in an opposite direction of winding and are connected with each other at each beginning and end of the coil so that during excitation of the coils, poles of alternating polarity are produced in the pole faces 6 of the pole branches. In the drawing, these poles are marked with the letters N and S. On both sides of the bogie (not shown in the drawing), a complete track brake, which is composed of individual elements, is fastened between the running wheels to non-resiliently mounted parts of said bogie so that a constant air gap 7 is guaranteed between the pole faces 6 and the tread 8 of the track.

In an advantageous way, the energizing coils of each of the track brakes are divided into two separate current circuits and each circuit is electrically connected in a way that half the number of coils of one of the brakes which are mounted on one side of the bogie are always excited together with the half of the coils on the other side of the bogie. Thus, a second current circuit of the brakes, which are facing each other at the bogie, can still be effective in case that the first current circuit should fail.

FIG. 1 shows that, within the portion facing the track, the energizing coils are provided with a coil length ($l$) between the pole branches which is smaller than the coil length provided on the side which is turned away from the track and the pole branches, respectively. The greater coil length has been designated ($l_1$). By reducing the coil length ($l$) of the energizing coils between the pole branches, the field strength which is opposite to the leakage flux emananting from the poles, will become very high. This strong counter-field tends to reduce the leakage occurring between the poles of opposite polarity to a considerable extent so that a greater density of the magnetic lines of flux is produced between the poles of the pole branches and the track.

On the other hand, however, the current density becomes very high when reducing the coil length ($l$) between the pole branches. Due to the good thermal conductivity of the winding of the energizing coil, the resultant higher heat generated is conducted to the larger cross-section and to that portion, respectively, which is provided with the greater coil length ($l_1$). There, the heat can be dissipated well because of the large surface area. Since there is sufficient space available in that portion of the brake which is turned away from the track, it is possible — as shown in FIG. 1 and the braking element B illustrated therein — to provide air channels 11 between the individual windings of the energizing coil in order to achieve an even better dissipation of heat. In addition, a cooling liquid such as silicon fluid can be conducted through these air channels.

In order to reduce the leakage losses between the pole branches to a particularly effective extent, it is advantageous to keep the distance ($a$) illustrated in FIG. 1 as small as possible between the pole faces 6 and the outer face 12 of the coil. This distance ($a$) should be within the range of 5–30 mm.

As shown in FIGS. 1 and 2, the individual coils are each composed of a single ribbon of electrically conductive material, e.g. copper, silver, or aluminum wound into a helix with electrical insulation between the individual turns and the core. The winding, for the purpose of reducing the length ($l$), is provided with recesses 15,16 which are arranged on its opposite front faces 13,14 within the range of the pole branches. These recesses are preferably milled out of the energizing coil after it has been wound.

As can be seen from FIG. 2, the portion of the ribbon winding of the braking element B outside of the space between the pole branches 5 has been so wound as to leave air channels or spaces 11, whereas the ribbon winding of the braking element A has not been provided with air channels of that type. Furthermore, FIG. 2 clearly shows a pole branch 5 and a sectional view of the coil core 1. Said Pole branch 5 partially extends through the milled-out recess 15 of the energizing coil 2.

Laboratory tests simulating field conditions indicate that a brake embodying the present invention gives higher braking forces then any other type eddy current and hysteresis brake ever tested. Obviously, a complete track brake may be made of more than two braking elements A,B arranged in end to end relationship with the north pole of one element always being adjacent the north pole of the next adjacent element. Preferably, there are always an even number of elements so that the middle pole of the assembly is the same magnetic polarity as the two end poles.

The present invention has been described in connection with a certain structural embodiment, however, it is appreciated that various changes may be made in this embodiment without departing from the intended spirit and scope of the present invention as defined by the appended claims.

Having thus described my invention, I claim:

1. An electrically-energized eddy current and hysteresis brake for track bound vehicles comprising: a plurality of electromagnets in aligned relationship parallel to the length of the track, each magnet being comprised of a pair of spaced pole branches extending perpendicularly away from the track, a coil core extending parallel to and spaced from the track and a coil around the core with the direction of winding and interconnections between the individual coils of adjacent magnets being so arranged as to provide alternate magnetic polarity on the pole faces of the electromagnets, the improvement which comprises: the portion of the coil in the space between the pole branches and the track having an axial length substantially less than the axial length of the coil on the sides and portions of the coil core remote from the track.

2. The improvement of claim 1 wherein the ratio of the shorter coil length to the longer coil length is 1 to 1.5.

3. The improvement of claim 1 wherein the distance between the pole faces of the pole branches and the outer surface of the coil in the space between the pole branches is within the range of 5-30 mm.

4. The improvement of claim 1 wherein the coil is comprised of a helical coil of an electrically conductive ribbon of a nominal width greater than the axial spacing between the pole branches, the portion of the coil between the pole branches having been reduced in axial length to receive the pole branches.

5. The improvement of claim 1 wherein the central pole of the brake is of the same magnetic polarity as the poles at the longitudinal ends of the brake.

6. The improvement of claim 1 wherein the individual turns of the coil on at least the sides of the core remote from the track are radially spaced to provide air cooling passages therebetween.

7. The improvement of claim 1 wherein the individual turns of the coil on the side having the greater coil lengths are radially spaced.

8. The improvement of claim 7 wherein the spaces between said turns contain a circulating cooling fluid such as silicon fluid.

9. In an electrically energized eddy current and hysteresis brake system for track bound vehicles, wherein said vehicle has a plurality of brakes mounted thereon adjacent the track, each brake being comprised of a plurality of electromagnets, at least a portion of the electromagnets on one brake being in electrical series with at least a portion of the electromagnets of the other track brake and the other portions of the first-mentioned brake being in electrical series with the remaining portions of the electromagnets on the second-mentioned track brake.

* * * * *